United States Patent [19]
Ojala

[11] Patent Number: 5,655,092
[45] Date of Patent: Aug. 5, 1997

[54] MULTIPLE ELEMENT INTERFACE

[75] Inventor: Jorma Ojala, Kulji, Finland

[73] Assignee: Nokia Mobile Phones Limited, Salo, Finland

[21] Appl. No.: 344,453

[22] Filed: Nov. 23, 1994

[30] Foreign Application Priority Data

Nov. 26, 1993 [FI] Finland .................... 935272

[51] Int. Cl.⁶ .................................... G06F 13/00
[52] U.S. Cl. .................................... 395/309; 395/282
[58] Field of Search ................. 395/750, 309, 395/281, 282, 283

[56] References Cited

U.S. PATENT DOCUMENTS

| | | | |
|---|---|---|---|
| 4,771,399 | 9/1988 | Snowden et al. | 395/750 |
| 5,268,819 | 12/1993 | Lonka . | |
| 5,292,259 | 3/1994 | Scheldrake et al. . | |
| 5,451,933 | 9/1995 | Stricklin et al. | 340/825.06 |
| 5,463,261 | 10/1995 | Skarda et al. | 307/101 |

OTHER PUBLICATIONS

*PCMCiA Standards;* Personal Computer Memory Card International Association; Sunnyvale, CA; Nov. 1992; pp. 4-2, 4-3 and 4-11.

*Primary Examiner*—Glenn A. Auve
*Attorney, Agent, or Firm*—Perman & Green

[57] ABSTRACT

The object of the invention is an expanded PCMCIA interface and a method for identifying such an expanded interface. According to the invention, among the power transmission pins of a standard PCMCIA interface, two of which are reserved for operating voltage and four for ground potential (P1, P2, P3, P4), maximally one operating voltage pin and three ground potential pins (P1, P2, P3, P4) have been redefined such that they are connected to a different voltage than standard voltage (GND, GND, VCC). This allows analogue and/or digital signals to be transferred through the redefined pins. Each redefined pin is preferably provided with a resistance coupling (Ra, R2, R3), by means of which the voltage prevailing in the redefined pin (P1, P2, P3, P4) has been raised (VCC) respectively dropped (GND) compared to the ground potential (GND) and operating voltage (VCC) of a standard pin. The PCMCIA interface according to the invention is identified such that the voltages of the redefined pins (P1, P2, P3, P4) are examined in a PCMCIA card (14) equipped with an expanded PCMCIA interface which can be installed in the PCMCIA card slot (16) of the host device (1) immediately after the card has been installed, and if the card slot (16) is identified as a card slot of an expanded PCMCIA interface (13), signals can be transferred through these redefined pines (P1, P2, P3, P4).

19 Claims, 3 Drawing Sheets

FIG.1

| PCMCIA INTERFACE | | | | |
|---|---|---|---|---|
| | PCMCIA INTERFACE STANDARD V2.01 | | EXPANDED PCMCIA INTERFACE HOST DEVICE | |
| | CARD | HOST DEVICE | IDENTIFICATION/ VOLTAGE GENERATOR | IDENTIFICATION/ RESISTANCE COUPLING |
| PINS 17, 51 | Vcc | Vcc | G1 — Va≠Vcc | Vcc — R1s — Va≠Vcc C — Ra |
| PINS 1, 34, 35, 68 | GND | GND | G2 — Vb≠GND | Vcc — Rb — Vb≠GND D — R2s |
| | | | A | B |

FIG. 2

MULTIPLE ELEMENT INTERFACE

BACKGROUND OF THE INVENTION

This invention relates to a multiple element interface for use with a computer or personal organiser.

A known multiple element interface comprises 68-pin connectors for transfer of data or electrical power, and complies to a PCMCIA (Personal Computer Memory Card International Association) standard. PCMCIA interfaces fitted to computers and other electronic devices allow a variety of exchangeable integrated circuits to be connected thereto. The exchangeable integrated circuits are usually contained in a convenient credit card sized case, the whole assembly being known as a PCMCIA card. Storage cards and expansion cards are the two main categories of PCMCIA cards although other uses may become available in the future. A storage card may, for example, include memory chips to increase the random access memory of a computer. An expansion card has The facility for allowing input and output of data to the host device, for example, a network card allowing connection of a computer to a network. A card slot is provided on the PCMCIA interface to allow insertion of a PCMCIA card into the host device. The interface standard defines two sets of connector pins, one of which is intended for a storage card and the other for a combined storage and input/output card.

Neither the PCMCIA interface standard nor the PCMCIA card specifications support the transfer of analogue signals through the standard 68-pin connector. For interfaces or cards to be compatible with the PCMCIA standard, data transmission over signal elements defined by the PCMCIA standard are required to be digital and at pre-determined levels. For all existing PCMCIA cards to be compatible with all existing PCMCIA interfaces the requirement for data transmission to be digital over the signal elements must remain. Changing one signal element from a digital to an analogue system may solve the immediate problem of analogue transmission but then existing PCMCIA standard devices will no longer be compatible.

SUMMARY OF THE INVENTION

According to a first aspect of the invention there is provided a method for transferring data between a first multiple element interface having a plurality of power transmission contacts and a plurality of digital data transmission contacts and a second multiple element interface having corresponding pluralities of power and digital data transmission contacts, the method comprising the steps of:
  electrically coupling the cooperating power transmission contacts of the first and second interfaces; and
  varying the voltage potential provided to one of the plurality of power transmission contacts on one of the first and second interfaces to provide signals indicative of data to be transferred to the cooperating power transmission contact of the other of the first and second interfaces.

An interface in accordance with the invention has the advantage of enabling signals to be transmitted over the power transmission lines without disturbing the existing contacts dedicated to digital data transmission. The step of voltage potential may be accomplished by modulating a predetermined voltage signal. The modulation could be analogue or digital. By providing analogue signals on the power transmission lines the interface is able to remain compatible with existing devices that may be connected to the interface. A further advantage of the modified interface is that it may be easily identified by the first interface attached thereto, and identification operation may be automated. This method is particularly suitable for use when the first interface is a PCMCIA card and the second interface is a PCMCIA interface. In which case, for example, any standard PCMCIA card may be installed into a card slot equipped with a PCMCIA interface modified in accordance with the invention and conserve its functionality in full without any risk of being damaged.

Suitably one of the coupled interfaces has means for recognising the other as being an interface modified in accordance with the invention. On recognising that it is coupled to a modified interface, that interface can then actuate means for instructing the other modified interface on the specifics of sending and receiving data.

Various ways of sending and receiving the data over the power transmission contacts are possible in accordance with the invention such as frequency shift voltage potentials, modulated voltage signals (continuous or periodic), or even digital voltage sequences.

In accordance with a second embodiment of the invention there is provided a multiple element interface, comprising a plurality of digital data transmission contacts, and a plurality of contacts arranged to provide plural power supplies for complementary contacts on a cooperating multiple element interface, one of the plurality of contacts providing a predetermined voltage level, and characterised in that another of the power supply contacts is operable at a variety of voltage potentials for providing signals indicative of data for transmission to the complementary contacts and provides a signal indicative thereof for identification by the cooperating interface.

In this way the interface provides a means by which the fact that data can be transmitted along one of the power pins can be identified. This has the advantage that cards compatible with the modified interface can take advantage of the further data transfer facility whereas those compatible with only the unmodified interface are undisturbed. Preferably means is provided for supplying the predetermined voltage to the data transferring power pin if a power supply pin and the data transferring power pin are short circuited for example by insertion of a noncompatible card interface.

The means for providing a predetermined voltage may comprise a voltage generator which is preferably a resistance coupling and a potential divider.

The multiple element interface is preferably provided within a host device and may have a separator, preferably a capacitor, on the data transfer power pin.

According to a third aspect of the invention there is provided a multiple element interface comprising a plurality of digital data transmission elements, and a plurality of contacts arranged for coupling with plural power supply contacts of a complementary element characterised in that the multiple element interface comprises means for recognising that one or more of the power supply contacts of the complementary element is capable of varying for providing signals indicative of data for transmission.

The means for recognising may comprise a voltage comparator and means for receiving and/or transmitting signals may be actuated in response to the means for recognising. The interface preferably comprises an integrated circuit card.

In accordance with a fourth aspect of the invention there is provided a method for transferring data between a first multiple element interface having a plurality for power transmission contacts and a plurality of digital data transmission contacts coupled with a second multiple element interface having corresponding pluralities of power and digital data transmission contacts, the method comprising the steps of:

providing a first set of signals indicative of data on a set of the plurality of digital data transmission elements of the first multiple element interface for transmission to the second multiple element interface;

processing the first set of signals to provide a second set of signals indicative of data;

providing the second set of signals to one or more of the power contacts of the second multiple element interface for transmission to the first multiple element interface.

The advantage of this aspect of the invention is that both sets of elements are on the same interface thus eliminating the requirement for a second interface. For example, if the interface is a card (e.g. a PCMCIA card) there is no need to have a second interface on a different edge. Suitably one of the sets of elements should feed a computer and the other set of elements a cellular telephone.

In accordance with a fifth aspect of the invention there is provided a multiple element interface comprising a plurality of digital data transmission contacts, and a plurality of power transmission contacts arranged for coupling with corresponding pluralities of power and digital transmission contacts of a cooperating multiple element interface characterised in that the multiple element interface comprises means for processing signals received from one of a set of the digital data transmission contacts and a power transmission contact and means for coupling the means for processing to the other of the set of digital data transmission contacts and the power transmission contact of the multiple element interface for transmission of signals indicative of data to the complementary element of the cooperating interface.

The interface is preferably a card that can receive data signals from one set of elements in a, say, PCMCIA interface, process the data, then transmit the processed data over a second set of elements of the PCMCIA interface. Equally the data may be sent in the opposite direction, i.e received initially by the second set of elements then transmitted by the first set of elements.

In accordance with a sixth aspect of the invention there is provided a host device comprising a radio telephone, a multiple element interface having a plurality of digital data transmission contacts, and a plurality of contacts arranged to provide plural power supplies for complementary contacts on a cooperating multiple element interface, one of the plurality of contacts providing a predetermined voltage level, another of the power supply contacts being operable at a variety of voltage potentials for providing signals indicative of data for transmission to the complementary element, and means for providing signals from the radio telephone to the another of the power supply contacts for transmission to the cooperating element.

BRIEF DESCRIPTION OF THE DRAWINGS

Embodiments of the invention will now be described, by way of example, with reference to the accompanying drawings, in which:

FIG. 1 is a table showing the properties of a known PCMCIA interface and a first PCMCIA interface modified in accordance with the invention, with reference to specific interface pins;

FIG. 2 is a table showing the properties of a second PCMCIA interface modified in accordance with the invention, with reference to specific interface pins.

DETAILED DESCRIPTION OF THE INVENTION

Figure 3:
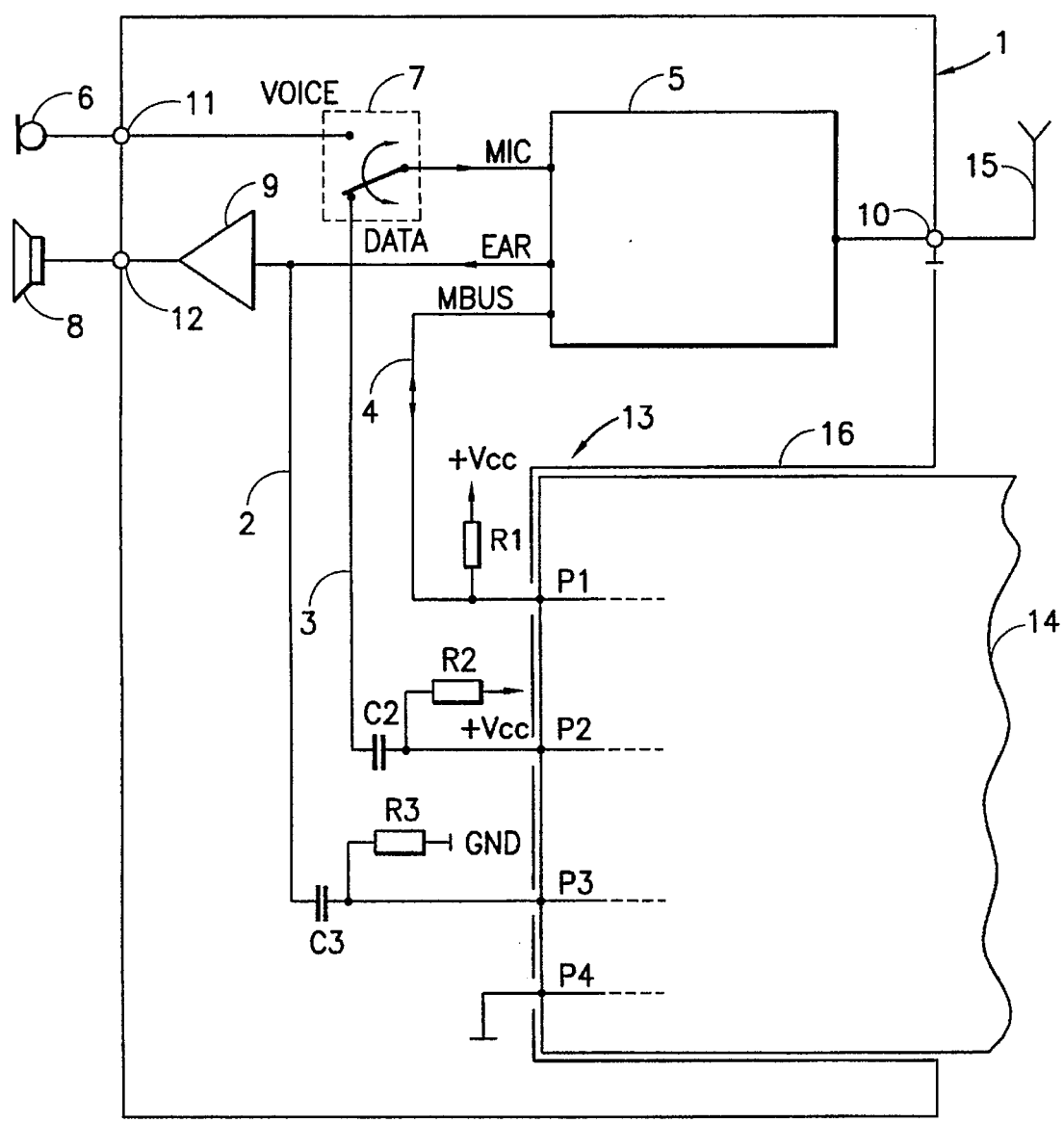
FIG. 3 shows an application of a PCMCIA interface modified in accordance with the invention.

A PCMCIA interface for a host device comprises a 68-pin male connector and the PCMCIA card a complementary 68-pin female connector. The operation voltage is supplied to the PCMCIA card from the host computer through six standard connector pins, i.e. electrical power transmission pins. Among these six power transmission pins, two are reserved for an operation voltage, VCC (pins 17 and 51), and the remaining four pins are reserved for a ground potential (pins 1, 34, 35 and 68).

The PCMCIA standard sets out certain criteria for the PCMCIA card defined as follows; each electrical contact element must be capable of transmitting a current up of to 0.5 A; and the connection resistance of each electrical contact element must not exceed 0.06 ohm. With regards the PCMCIA host device, the standard requires that the direct voltage supplied from the power source has a maximum allowable variation of +/−5% in the power transmission pins of the interface. The transmission voltage as defined by the PCMCIA standard may be exclusively either +5 V or +3.3 V.

In known electronic logic circuits, comprising amongst others SSI/MSI circuits, ASIC circuits and microprocessors, reliable operation is ensured only if the power transmission voltage remains within a +/−10% tolerance provided that the PCB layout and the connections have been duly considered.

The maximum voltage drop over any individual contact element is 0.5 A (max.)×0.06 ohm (max.)=30 mV (max.). With the nominal operating voltage of the power transmission pins being +5 V, the 30 mV voltage drop will result in a 0.6% voltage drop in the least favourable case. When the operating voltage of the power transmission pins is +3.3 V, the voltage drop will only be of the order of 0.9%.

Typical currents required by most PCMCIA cards, either storage cards or expansion cards, are lower than the current capacity of individual contact elements, defined previously as 0.5 A (max.). This is mainly due to the fact that PCMCIA interfaces are primarily intended for portable devices, such as portable computers, notebook microprocessors, individual systems and mobile stations, which are unable to transfer high currents to a PCMCIA card over long periods.

In terms of the PCMCIA standard, a PCMCIA card is not defined as requiring two power transmission pins and corresponding VCC voltages to be combined in the card. Neither does the standard define that four ground potential pins and corresponding GND zero potentials be combined in the card. This leads to the conclusion that the host device does not use the operating voltage (VCC) or earth connection (GND) of the PCMCIA card for any signalling purpose.

Having made The previously described discoveries a new PCMCIA interface can be provided in which all the power transmission pins belonging to the PCMCIA interface are not necessary for power transmission purposes. The present invention makes use of this discovery to use these pins for other purposes.

FIG. 1 illustrates a known PCMCIA Interface, Version 2.01 (1 Nov. 1992), and two PCMCIA interfaces, modified in accordance with the invention in particular the pins used for power transmission between the host device and the PCMCIA card, i.e. pins 17, 51 and 1, 34, 35 and 68. In a PCMCIA interface, the operating voltage VCC=+5 V is connected to contact elements of the PCMCIA card through pins 17, 51. The pins 1, 34, 35 and 68 in accordance with the PCMCIA standard are connected to the ground potential both in the PCMCIA interface and the PCMCIA card. In a PCMCIA interface modified in accordance with the invention maximally one voltage pin and Three ground potential pins have been redefined, compared to known PCMCIA interface power transmission pins, of which two are reserved for operating voltage 17, 51 and four for ground potential 1, 34, 35, 68, so that they are connected to a different voltage from that defined in the PCMCIA standard.

In the first and most basic implementation of a PCMCIA interface in accordance to the invention illustrated in FIG. 1, voltage generators G1, G2 connect to the redefined pins of the host device. Voltage generators can be produced in various ways by those skilled in the art. In this case, a first voltage generator G1, connected between a pin, 17 or 51 and the ground potential (GND), is provided in the PCMCIA interface. A second voltage generator G2, connected between a pin, 1, 34, 35 or 68 and a ground potential (GND), is provided in the PCMCIA interface. The voltages $V_a$(VCC) and $V_b$(O) generated by voltage generators G1, G2 differ from standard direct voltage values VCC, GND of pins found in PCMCIA interfaces. Thus, the standard voltages $V_a$, $V_b$ generated by the voltage generators are easily identified by means provided in the PCMCIA card as voltages differing from the standard voltages VCC, GND of the pins, and at the same time, the PCMCIA interface of the host device is identified as PCMCIA interface in accordance with the invention. Voltage generators G1, G2 may generate for example direct voltage, alternating voltage, voltage impulse sequences or similar.

In the second PCMCIA interface, in accordance with the invention the redefined pins of the host device comprise resistance couplings, The redefined pin of the interface comprises for instance resistance $R_a$, $R_b$, connected between this pin and the opposite potential (VCC, GND) to the standard pin potential (VCC, GND). Here the resistance $R_a$ is connected to pin 17 or 51, one end of the resistance having ground potential and resistance $R_b$ is connected to pins 1, 34, 35, 68, one end of this resistance having operating voltage VCC, for example +5 V. In this case, the purpose of resistances $R_a$, $R_b$ are to act only as elements limiting the current, and thus their mutual ratios have no significance. The voltage operating in the redefined pins have been raised and dropped respectively, compared to the ground potential and operating voltage in a standard pin.

The resistance couplings in the second PCMCIA interface B can generally be described as serially connected resistance chains. In this case, a first resistance chain $R_{1a}R_a$ and a second resistance chain $R_bR_{2a}$ (resistances $R_{1a}$, $R_{2a}$ are represented with dashed lines in FIG. 1) are provided between the operating voltage VCC and the ground potential GND in the interface. The first resistance chain $R_{1a}R_a$ is connected to the operating voltage pin 17 or 51 via the junction at C and the second $R_{2a}R_b$ to the ground potential pin 1, 34, 35, 68, via the junction at D. The voltages $V_a$(VCC) and $V_b$(O) at the junctions C, D, i.e. the voltages generated from the operating voltage VCC by means of resistance chains $R_{1a}R_a$, $R_{2a}R_b$, differ from the standard direct voltages VCC, GND of the pins. Thus, voltages $V_a$, $V_b$ are easily identified by means provided in the PCMCIA card, as voltages differing from the standard voltages. VCC, GND of the pins, and at the same time, the PCMCIA interface of the host device is identified as a PCMCIA interface in accordance with the invention.

Figure 2:
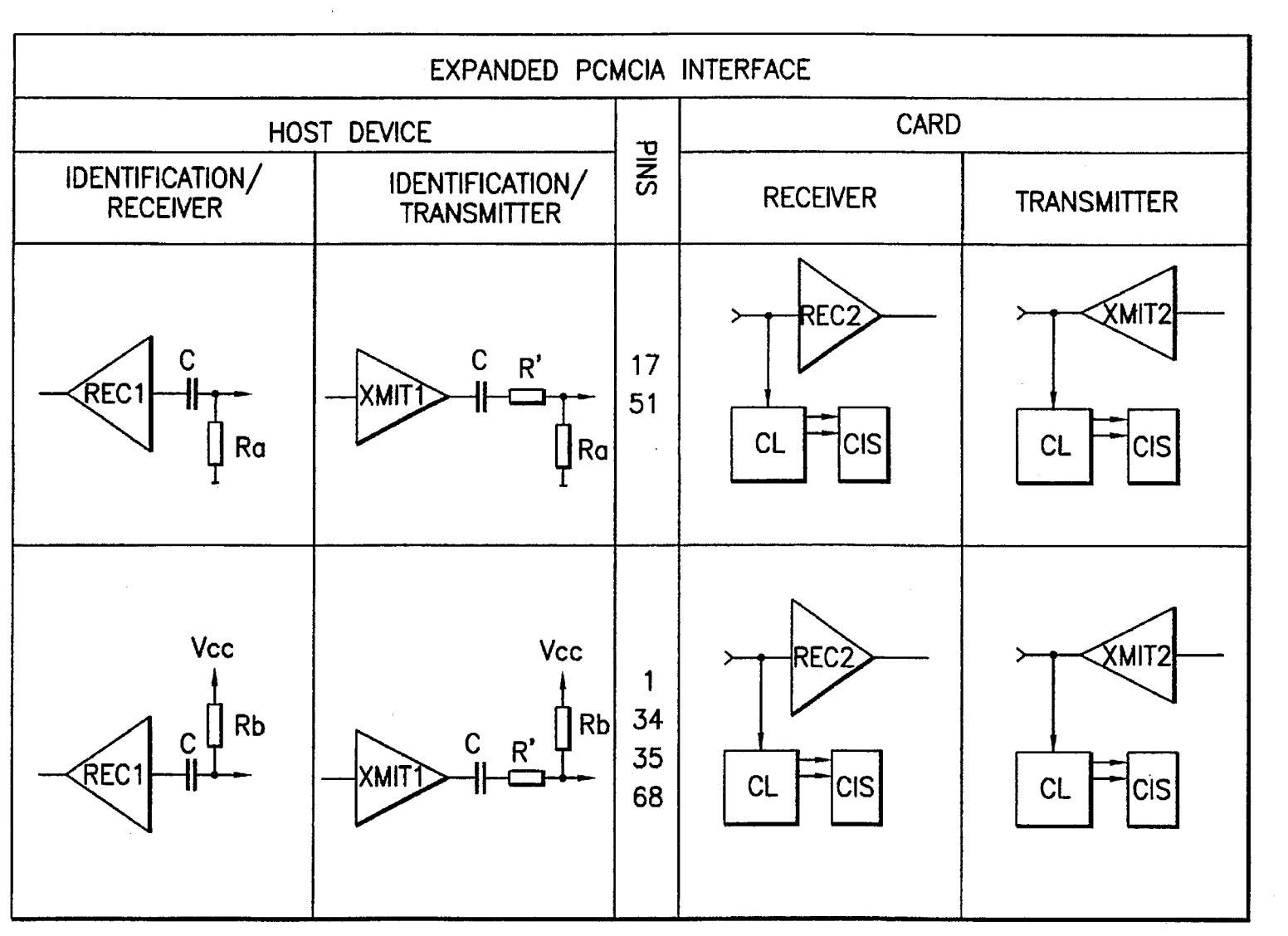

As signals are being transferred through the redefined pin 17, 51; 1, 34, 35, 68 of the PCMCIA interface, a transmitter xmit1 and a receiver rec1 are connected to the host device, and to complement these, a receiver rec2 and a transmitter xmit2 are connected to the corresponding elements of the PCMCIA card to be installed in the PCMCIA interface. This embodiment is illustrated in FIG. 2. In this case, one pin of the expanded PCMCIA interface is used for transmitting signals as seen from the host device, i.e. the transmitting pin of the PCMCIA interface, and another pin is used for receiving signals, i.e. the receiving pin of the PCMCIA interface. Seen from the PCMCIA card, the receiving element of the card corresponds to the transmitting pin of the host device, and the transmitting element of the card corresponds to the receiving pin of the host device.

A resistance coupling, shown in FIG. 2 as resistance $R_a$, $R_b$, is provided on the transmitting pin and receiving pin of the host device. Starting from the pin towards the host device, the resistance coupling is followed by either transmitter rec1 or a receiver xmit1. A separator is optionally connected between the resistance coupling and the transmitter rec1/receiver xmit1, shown in FIG. 1 as capacitor C. The separator is only used when analogue signals are being transmitted over the pins. The resistance $R_a$ of the resistance coupling connected to pin 17 or 51 is connected to the potential opposite to the corresponding pin of a standard interface, i.e. the ground potential, and the resistance $R_b$ connected to pins 1, 34, 35 or 68 is connected to the operating voltage VCC, which is, for example, +5 V. A second resistance R' may be provided in connection with the transmitting pin, between the capacitor C and the resistance coupling $R_a$, $R_b$, to set a voltage level that is suitable for the receiving element of the card.

In the embodiment described above, resistance coupling is used to implement identification voltage in the PCMCIA interface, However, it should be appreciated that the invention is not confined merely to resistance coupling, but to all the means mentioned above, i.e. the voltage generator, an individual resistance ($R_a$, $R_b$) and resistance serial connection ($R_{1a}$, $R_a$, $R_{2a}$, $R_b$) are useful for generating an identification voltage in the PCMCIA interface pins of the host device.

In PCMCIA interfaces modified in accordance with the invention the pins 17, 51 and 1, 34, 35 and 68 have been connected to corresponding elements in the circuit card such that a element defined as a receiving element is connected to a receiver rec2 and identifying means in the PCMCIA card. With an element defined as a transmitting element a transmitter xmit2 is connected To this element along with identifying means in the PCMCIA card.

In terms of the standard, the identifying means of the PCMCIA card comprises a card identification structure (CIS) and a configuration logic (CL).

The card identification structure CIS is a data structure located in the PCMCIA card which can be read by the host device via the PCMCIA interface. The card identification structure CIS is typically placed in a non-volatile storage circuit in the card, containing industrially programmed data. The card identification structure is read by the host device immediately after the PCMCIA has been installed, and it supplies the host device with information on the functions included in the card and the use of the card.

The configuration logic CL is typically a circuit switching implemented with combinatory logic. The purpose of the configuration logic CL is to supply the host device with information on the card identification structures CIS provided in each host device. Assuming for clarity's sake there exists a group ILi (i=0, 1, 2, . . . ) of host devices, each possessing a PCMCIA modified interface which operate differently; assuming also there exists a PCMCIA modified in accordance with the invention; this card includes a card identification structure CIS, in which information about a number of host devices ILi is stored and which contains the data structures CISi (I=0,1,2 ...) for each host device. When the PCMCIA card is inserted into the PCMCIA interface of the host device ILi, host device IL0 has access to the card identification structure CIS0, host device IL1 has access to the card identification structure CIS1 etc. Note that one member of the group of host devices, say IL0, may contain a PCMCIA interface fully complying with the PCMCIA standard.

Voltage comparators connected to the operating voltage pins 17, 51 and the ground potential pins 1, 34, 35, 68 can be included in the configuration logic. These serve to identify changes in the voltage states of the power transmission pins in the PCMCIA interface of the host device, compared to standard operating voltage and ground potential values. Other voltage identification methods and devices known per se can also be applied.

The PCMCIA interface of the host device, modified in accordance with the invention is identified by means of a modified PCMCIA card equipped with circuits for enabling receiving and transmission of data along the redefined pins. The voltages have been changed in maximally four redefined pins of the PCMCIA card slot of the host device, such as for instance 51, 1, 34, 35, 68, having been raised with the voltage generator or the resistance coupling (FIG. 1) or respectively dropped as compared to the voltage potentials of the corresponding pins of a standard PCMCIA interface. When the PCMCIA card modified as in accordance with the invention is inserted in the PCMCIA interface of the host device, any redefined pins will be identified by the identification means of the PCMCIA card, preferably immediately after the PCMCIA card has been inserted. The PCMCIA interface modified in accordance with the invention is identified on the basis of at least one change in the pin voltage. The PCMCIA interface being identified as an interface modified in accordance with the invention allows both analogue and digital signals to be transmitted and received through the redefined pins. When the pins are redefined, the pins of the host device and of the circuit card are set either as receiving or transmitting terminals. The pins can be freely defined in this respect.

One should note that, when the PCMCIA interface modified in accordance with the invention is being implemented, a resistance coupling or a similar current-limiting circuit switching must be applied to the pins of the PCMCIA interface in the host device. In a typical PCMCIA standard circuit card, the operating voltage pins of the power transmission pins and the corresponding ground potential pins are interconnected. If no resistance coupling or similar countercurrent-limiting switching is provided in the redefined pins of the PCMCIA interface in the host device, such a PCMCIA card, when installed, will bring about a short circuit between the operating voltage and the ground potential of the host device, to detrimental effect.

An application of the PCMCIA interface modified in accordance with the invention is illustrated in FIG. 3. The host device 1 comprises a PCMCIA card slot 16. The physical structure of the card slot 16 corresponds to the standard PCMCIA interface slot. A number of the power transmission pins of the PCMCIA interface have been redefined in accordance with the invention.

The pins P1, P2, P3, P4 of the PCMCIA interface modified in accordance with the invention illustrated in FIG. 2, may be any pins 17, 51; 1, 34, 35, 68 of a PCMCIA interface (FIG. 1). The table shows the PCMCIA standard definitions of the pins (Standard L) and the definitions of the PCMCIA interface modified in accordance with the invention (Expanded L).

TABLE

| Pin | Standard L | Expanded L |
|-----|-----------|------------|
| P1 | earth | voltage up + signal |
| P2 | earth | voltage up + signal |
| P3 | voltage | voltage down + signal |
| P4 | earth | `earth |

In the PCMCIA interface 13, the change of the standard voltage properties of the pins P1, P2, P3 have been carried out by means of the resistances R1, R2, R3. The pins P1 and P2 have been connected by means of the resistances R1 and R2 to the operating voltage VVC, whereas the pin P3 has been connected over the resistance R3 to the ground potential GND. In this application, the pin P4 has not been redefined, i.e. it remains at ground potential according to the standard. The capacitors C2, C3 are used to prevent direct voltages of the pins P2, P3 entering the card, whereas alternating current signals may pass through RC filters (R2C2 and R3C3) from the to the host device 1 PCMCIA card 14 and vice versa through wires 2,3.

The host device 1 illustrated in FIG. 3, contains an analogue cellular mobile telephone 5 and a PCMCIA interface 13 modified in accordance with the invention. The microphone 6 of the host device is connected through connector 11 and a two-position switch 7, to the MIC input of the telephone 5. The loudspeaker 8 of the host device is connected through connector 12 and amplifier 9 to the EAR output of the telephone 5. The pin P3 of the PCMCIA interface 13 is also connected by means of the wire 2 to the EAR output of the telephone 5. The pin P2 is connected through the wire 3 to the DATA pin of the two-position switch 7, whereas the microphone 6 is connected to the VOICE pin of the switch 7. The pin P1 is connected through the wire 4 to the MBUS pin of the telephone 5. The telephone 5 is further connected with the antenna connector 10, which is in turn connected with the antenna for sending and receiving radio transmissions.

The host device I can be used for a normal speech communication. In this case, the switch 7 is set to the VOICE position. When a PCMCIA card modified in accordance with the invention is inserted into the card slot, the host device may also be used for a data communication. In this case, the switch 7 is set to the DATA position. The expanded PCMCIA card uses the redefined interface pins P1, P2 and P3 for data transfer between the card and the host device. In this application, a bi-directional digital control line passes through the pin P1 between the PCMCIA card 14 and the host device telephone 5. Voice frequency alternating current is transferred from the PCMCIA card 14 to the telephone 5 over the pin P2 and from the telephone 5 to the card 14 over the pin P3. The PCMCIA card 14 may, for example, be a modem card in which pins P1, P2 and P3 of the PCMCIA interface 13 are used for data transfer as described above.

The telephone implementation described above has the advantage that the PCMCIA card does note require a second connector and cable at the end opposite to the PCMCIA interface, as is needed in an ordinary application to connect the modem card with a mobile telephone. In this application, the use of the PCMCIA interface modified allows the mobile telephone and the modem to be joined into an integrated assembly.

In the PCMCIA interface modified in accordance with the invention the connector part of the PCMCIA interface and also the connector part of the PCMCIA card to be inserted, comply with standard interface, except for the fact that the electric properties of some of the pins have been modified. A PCMCIA card equipped with an expanded PCMCIA interface identifies, by identification means described above (FIG. 1), the PCMCIA interface of the host device as the PCMCIA interface modified in accordance with the invention when the card is installed in the card slot. The identification preferably takes place partly on a circuit level and partly on a program level. Any standard PCMCIA card may be installed into a card slot equipped with a PCMCIA interface modified in accordance with the invention and conserve its functionality in full provided the GND and VCC voltage rails are electrically interconnected within the card. An additional advantage is that neither the host device nor the PCMCIA card will be subject to any damage.

In terms of the PCMCIA interface modified in accordance with the invention one or more of the operating voltage and ground potential pins are redefined for another use. In some cases, the input/output connector, normally fitted at one end of the PCMCIA circuit card, may be left out. This simplifying card option can be utilised, for example, in a data/telex modem combined with a cellular mobile telephone, as stated above with regard to FIG. 3, and in similar combinations of analogue and/or digital mobile telephones and data transmission devices. The redefined power transfer pins of the expanded PCMCIA interface can be used to control the address pins of a parameter storage. In the event that the PCMCIA card has been designed to support a number of host devices, the host device may use it without modifying existing standard software interface, i.e. socket services and card services.

An PCMCIA interface modified in accordance with the invention has been described above, in which, among standard PCMCIA interface power transfer pins, two of which are reserved for operating voltage 17, 51 (FIG. 1) and four for ground potential 1, 34, 35, 68, maximally one voltage pin and three ground potential pins have been redefined such that, compared to standard potential, they are connected to a different direct voltage potential, and particularly to an opposite standard direct voltage potential. This is the simplest way of implementing the PCMCIA interface modified in accordance with the invention.

However, the four power transmission pins mentioned above, or at least one of them, can be optionally connected to various types of potential. Examples of other types of potentials includes frequency shift potentials, modulated voltage signals, continuous or periodical, or even a digital voltage sequences.

In view of the foregoing description it will be evident to a person skilled in the art that various modifications may be made within the scope of the invention. In particular those features for identifying a compatible interface can be provided on the card or the interface or both.

The scope of the present disclosure includes any novel feature or combination of features disclosed therein either explicitly or implicitly or any generalisation thereof irrespective of whether or not it relates to the claimed invention or mitigates any or all of the problems addressed by the present invention, The applicant hereby gives notice that new claims may be formulated to such features during prosecution of this application or of any such further application derived therefrom.

What is claimed is:

1. A method for transferring analog data between a first multiple element interface having a plurality of power transmission contacts and a plurality of digital data transmission contacts and a second multiple element interface having corresponding pluralities of power and digital data transmission contacts, the method comprising the steps of:
   electrically coupling the cooperating power transmission contacts of the first and second interfaces; and
   varying the voltage potential provided to one of the plurality of power transmission contacts on one of the first and second interfaces to provide signals varying over a range of amplitudes representative of analog data to be transferred to the cooperating power transmission contact of the other of the first and second interfaces.

2. A method according to claim 1 wherein the voltage potential is varied on one of the first and second interfaces and wherein prior to the step of varying the voltage, the method further comprises the steps of:
   one of the first and second interfaces recognising that the voltage potential on one of the plurality of power transmission contacts on the other of the first and second interfaces is capable of varying; and
   indicating that the corresponding power transmission contact of the one of the first and second interfaces is capable of receiving signals representative of analog data.

3. A method according to claim 1 wherein the step of varying the voltage potential comprises modulating a predetermined voltage signal in accordance with analog data signals.

4. A method according to claim 1 wherein the voltage potential on the one of the plurality of power transmission contacts capable of varying is biased with a voltage of a predetermined level.

5. A multiple element interface, comprising a plurality of digital data transmission contacts, and a plurality of contacts arranged to provide plural power supplies for complementary contacts on a cooperating multiple element interface, one of the plurality of contacts providing a predetermined voltage bias level, and characterised in that another of the power supplying contacts is operable at a variety of voltage potentials for providing signals representative of analog data for transmission to the complementary contacts and provides a signal indicative thereof for identification by the cooperating interface.

6. A multiple element interface according to claim 5 further comprising means for providing the predetermined voltage bias level to the another of the contacts if the one of the contacts and the another of the contacts are short circuited.

7. A multiple element interface according to claim 5 wherein the another of the power supply contacts for providing the signal indicative thereof comprises a voltage generator.

8. A multiple element interface according to claim 5 wherein the one of the plurality of contacts providing the predetermined voltage bias level comprises a voltage generator.

9. A multiple element interface according to claim 8 wherein the voltage generator comprises a circuit including a resistance coupling and a potential divider.

10. A multiple element interface according to claim 9 wherein the multiple element interface is provided within a host device.

11. A multiple element interface comprising a plurality of digital data transmission elements, and a plurality of contacts arranged for coupling with plural power supply contacts of a complementary element characterised in that the multiple element interface comprises means for recognising that one or more of the power supply contacts of the complementary element is capable of varying for providing analog signals having a varying range of amplitudes representative of analog data for transmission.

12. An interface according to claim 11 wherein the means for recognising comprises a voltage comparator.

13. An interface according to claims 11 wherein the means for recognising further comprises means for providing the complementary element with information indicating the capability of receiving the analog signals representative of analog data for transmission.

14. An interface according to claim 11 further comprising means for receiving and/or transmitting the analog signals actuable by the means for recognising.

15. An interface according to claim 11 wherein the interface comprises an integrated circuit card.

16. A method for transferring analog data between a first multiple element interface having a plurality of power transmission contacts and a plurality of digital data transmission contacts coupled with a second multiple element interface having corresponding pluralities of power and digital data transmission contacts, the method comprising the steps of:

providing a first set of signals varying over a range of amplitudes representative of analog data on a set of the plurality of digital data transmission elements of the first multiple element interface for transmission to the second multiple element interface;

processing the first set of analog signals to provide a second set of analog signals representative of analog data;

providing the second set of analog signals having a varying range of amplitudes to one or more of the power contacts of the second multiple element interface for transmission to the first multiple element interface.

17. A method according to claim 16 wherein the second set of signals is suitable for processing by a radio telephone.

18. A multiple element interface comprising a plurality of digital data transmission contacts, and a plurality of power transmission contacts arranged for coupling with corresponding pluralities of power and digital transmission contacts coupling with corresponding pluralities of power and digital transmission contacts of cooperating multiple element interface characterised in that the multiple element interface comprises means for processing signals received from one of a set of the digital data transmission contacts and a power transmission contact and means for coupling the means for processing to the other of the set of digital data transmission contacts and the power transmission contact of the multiple element interface for transmission of signals varying over a range of amplitudes representative of analog data to the corresponding pluralities of power transmission contacts of the cooperating interface.

19. A host device comprising a radio telephone, a multiple element interface having a plurality of digital data transmission contacts, and a plurality of contacts arranged to provide plural power supplies for complementary contacts on a cooperating multiple element interface, one of the plurality of contacts providing a predetermined voltage level, another of the power supply contacts being operable at a variety of analog voltage potentials for providing signals varying over a range of amplitudes representative of analog data for transmission to the complementary contacts, and means for providing signals from the radio telephone to the another of the power supply contacts for transmission to the complementary contacts.

* * * * *